United States Patent [19]

Hellwig

[11] Patent Number: 5,026,286

[45] Date of Patent: Jun. 25, 1991

[54] COLOR STANDARD ARRANGEMENT

[76] Inventor: Gerriet Hellwig, Teufenerstrasse 13, 9001 St. Gallen, Switzerland

[21] Appl. No.: 356,648

[22] Filed: May 19, 1989

Related U.S. Application Data

[63] Continuation of Ser. No. 12,297, Feb. 9, 1987, abandoned.

[30] Foreign Application Priority Data

Feb. 10, 1986 [CH] Switzerland ............... 1017/86

[51] Int. Cl.⁵ .................................... G09B 19/00
[52] U.S. Cl. .................................... 434/98; 434/104
[58] Field of Search ........................... 434/98, 101, 104

[56] References Cited

U.S. PATENT DOCUMENTS

| | | | |
|---|---|---|---|
| 1,709,975 | 4/1929 | Foshay | 434/98 |
| 2,866,277 | 12/1958 | Wise | 434/98 |
| 3,229,385 | 1/1966 | Pauw | 434/98 |
| 3,751,829 | 8/1973 | Foss | 434/98 |
| 4,009,527 | 3/1977 | Scott et al. | 434/98 |

FOREIGN PATENT DOCUMENTS 178216 4/1954 Fed. Rep. of Germany ........ 434/98

Primary Examiner—Robert Bahr
Assistant Examiner—D. F. Crosby
Attorney, Agent, or Firm—Shenier & O'Connor

[57] ABSTRACT

In order to overcome difficulties which arise when making conventional color charts and color spaces, a torus-shaped spacial structure is used as base body for the arrangement of color tones.

The gray tones are located at the outermost jacket area thereof and the clearest colors are located at the inner jacket area thereof. In the inside of the body, the colors extend through all color tone steps from the clearest up to the gray tones. By means of an iterative method for the arranging of color tones in the torus, it is possible not only to discriminate the color tones for the human eye equidistantly, but also to represent the brown colors reliably.

20 Claims, 2 Drawing Sheets

COLOR STANDARD ARRANGEMENT

This is a continuation of co-pending U.S. application Ser. No. 07/012297 filed on Feb. 9, 1987, now abandoned.

BACKGROUND OF THE INVENTION

1. Field of the Invention

The present invention relates to a color standard arrangement in a spacial shape of which one color is allocated to every location of the spacial shape. The invention is related further to a method for a numerical determination of colors as well as an application of the color standard arrangement for producing equidistant rows of colors.

2. Description of the Prior Art

Color is formed by the three base colors yellow, blue, and red. A known color arrangement is structured as follows. The base colors are arranged in a triangle. If two respective base colors are mixed and the result of this mixture is located therebetween, complementary colors to the respective oppositely located color are achieved, such as, for instance, green as a mixture of blue and yellow and as a complementary color to red. Accordingly, a six-partite color circle is produced with a sequence of yellow, orange, red, purple (violet), blue, and green, which corresponds to the nominal colors of the rainbow. If the three base colors are mixed, turbid colors such as brown and gray are arrived at. These colors are arranged in the inside of the color circle, the center of which forms gray. Because these colors can also be brighter or darker, this color circle is extended to a globe shape, whereby the most intense colors are located on the equator thereof, from which the brighter colors are developed towards the top and the darker colors towards the bottom. At the north pole the color white is located, the south pole has the color black and the two poles are interconnected by a gray axis. Such a color globe is shown in FIG. G of the plate facing page 448 and described on page 448 of Webster's New International Dictionary (3rd Edition) published by the G & C Merriam Co., of Springfield, Mass.

This known color arrangement which as such is logically developed does, however, not meet the demands which are made specifically regarding a technical handling of colors and application of colors. It would be desirable to produce an order of colors which can be quantified and which allows an unequivocal coding of colors, i.e. allocation of the visually discernable colors to one respective code word. In order that such quantized order becomes sensible for technical applications, the tolerances of colors must be able to be measured. All colors which are respectively sensed visually to be the same should correspond to the same tolerance measure figures and such should proceed via the entire color arrangement. This cannot be achieved by means of the above mentioned arrangement.

A base problem when attempting to produce such color tables or color bodies is that in case of pure colors, such as, for instance, colors from the rainbow spectrum, the human eye is limited in its ability to discern fine color differences. However, in case of colors from the gray-brown section, extremely small steps of colors can be safely recognized without difficulty. The darker such colors are the greater is the precision of the human eye relative to a machine.

In the known color globe in which the pure colors are located on the surface and the dark to gray region colors are located in the inside, the graduations of the color tones are distorted for the human eye. The further one penetrates towards the inside of the globe the closer the color tones follow. At the outer surface, the large dimensions of the color areas, only a few color tones can be differentiated from each other.

SUMMARY OF THE INVENTION

Hence, it is an object of the invention to provide a color standard arrangement in which a color tone which is for the average viewer discernably different by the same amount from each of the colors of which it is composed is located at the same distance from each of the colors of which it is composed, thus permitting a numerical representation of color tolerances in the entire color space in the same manner.

According to the invention, the color standard arrangement has a color allocation to the spacial locations of the colors such that the color spacing is equal in the sense of the German industrial standards 6164 (DIN 6164), whereby the turbid colors are allocated a larger spacial volume than the pure colors.

By aid of such a standard arrangement, it is possible directly to classify the color distance of a test color by a visual comparison with an initial color. The corresponding spacial form incorporates a basically torus-like ring structure, wherein the pure base colors are located in the area around the central opening and the colors with increased turbidity are arranged in radially outward areas.

A further object of the invention is to provide by means of the color standard arrangement a method for an unequivocal determining of color tones and color tone deviations. It can be used, for instance, to decide in case of colored bodies if the color tones are located within a numerically set tolerance of deviations of color tones. Proceeding from the requested initial color a listing of color tone steps can be made in accordance with the inventive method, which encompasses, for instance, the allowable tolerance area. By means of an optical comparison of such list with the colors to be tested, it can then be decided easily if the coloring is still in the area of tolerances.

This method allows specifically the coding of colors in such a way as to permit the use of data processing techniques. To this end the standard arrangement of colors is scanned to find the color tone corresponding to the color which should be coded. If the corresponding color tone is found in the standard arrangement by an optical comparison with the coded color, the coordinates of this color tone in the standard arrangement are determined. These coordinates characterize unequivocally the coded color. Correspondingly, it is possible to determine from numerical values which represent the coordinates of the standard arrangement unequivocally again the same color.

Finally, a further object of the invention is to provide the basis for the production of rows of color tones having equidistant distances.

If, for instance, the color spectrum which is visible for the human eye is divided into 2500 color tones, a great difficulty is to determine those 20 color tones which, regarding their color differences, are equally distributed in these 2500 color tones. Such colors which are equally distributed in a broad color tone area must then be determined if, for instance, a standard or painting box color must be chosen or if color areas must be determined roughly.

BRIEF DESCRIPTION OF THE DRAWINGS

The present invention will be more fully understood by reference to the following detailed description thereof when read in conjunction with the attached drawings, and wherein.

DESCRIPTION OF THE PREFERRED EMBODIMENT

In the following description, by change in tone or shade is meant any change in color value, whether it be chromatic or achromatic. By density value, I mean Munsell value as a measure of achromatic lightness or darkness. By tint values I mean Munsell chroma which is the chromatic strength or weakness of a color.

The simplified sectional view of FIG. (or FIG. 3, respectively) is intended basically to explain the basic structure of the color standard arrangement.

Figure 1:
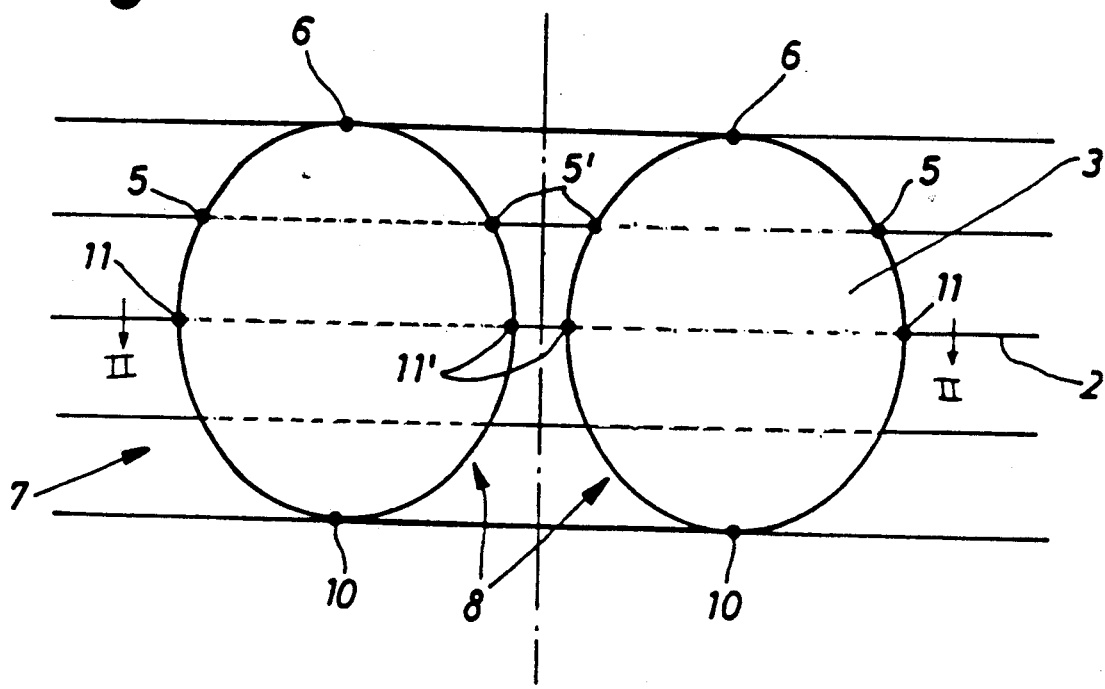
FIG. 1 illustrates an axial section through the annular structure in a simplified illustration.

FIG. 1 illustrates a torus-shaped annular structure in an axial section. The plane structure represents a simplification of the situation, from which this description proceeds, in order to facilitate the understanding thereof.

An upper circular line 6 represents the topmost surface line or north "pole" extending parallel to the center plane 2. The circular lines 5, 5' are produced by a section of a further plane extending to the center plane and extending to the ring structure.

The circular lines 11, 11' are the sectional lines of the center plane with the ring structure, whereby line 11 represents the section through the outer surface area or zone 7 and line 11' represents the section through the inner surface area zone 8. It will be apparent from the drawing that the surface area 8 forms a funnel-like opening.

In an analogous manner a bottom circular line 10 or south "pole" exists in the lower half ring and being the line of contact with a plane extending parallel to the center plane.

Figure 2:
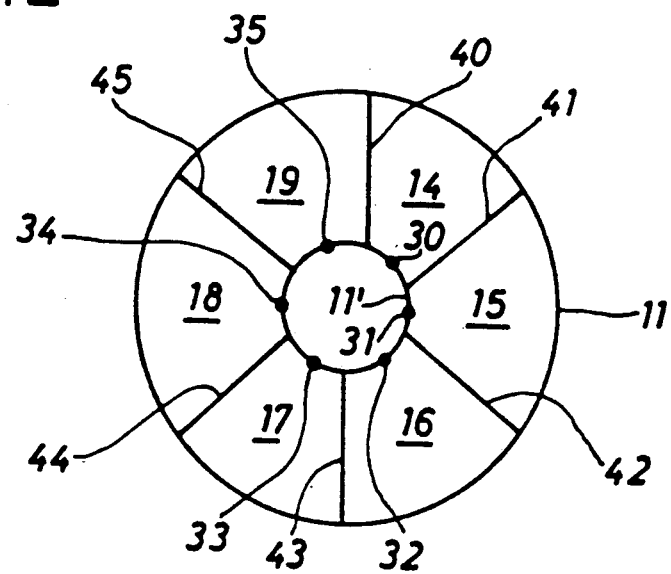
FIG. 2 is a section through the horizontal center plane of the ring structure along the line II—II of FIG. 1.

FIG. 2 illustrates the distribution of the colors in the horinzontal center plane 2. The six illustrated sectors 14 to 19 form the six-partite color circle with the colors orange, red, purple (violet), blue, green and yellow with the same brightness. Radially inside at the locations 30 to 35 the colors with the clearest form are represented, whereby they grow turbid from the inside towards the outside up to the center line 11 up to gray. At the surface area of the central opening 8 the generally true colors appear and the pure gray tones are located at the outer surface area 7 (see FIG. 3). Tint values are provided from substantially uniformly varying mixing ratios of at least two of the pure colors and of increasing chroma values defined by an increasing gray tint value wherein the associated spacial locations for at least six pure colors 30 to 35 are provided near the center zone 8 and the chroma values decreased toward the peripheral zone 7. The color black is located at the lowermost surface line 10, which color brightens on the outer surface through all gray tone steps successively to white at the highest surface line 6. Accordingly, the pure base colors and those colors which can be mixed out of the base colors are located in the inner portion of the sector, whereby further towards the outside the not pure colors, i.e. those colors consisting of three base colors, are distributed. The color circle produced in this way has no visible center point. Inside of the circle 11' of the brightest or clearest, respectively, colors there is no further color. Towards the center pure colors can be placed on a radius which corresponds to the human visibility in that it discerns the clear colors less from each other than the turbid colors.

It will be seen that the sectors or areas 14 to 19 are in a spatial configuration for receiving shades of colors, each shade in an associated spatial location. This permits the components of a shade of color to be calculated in a manner to be described.

Figure 3:
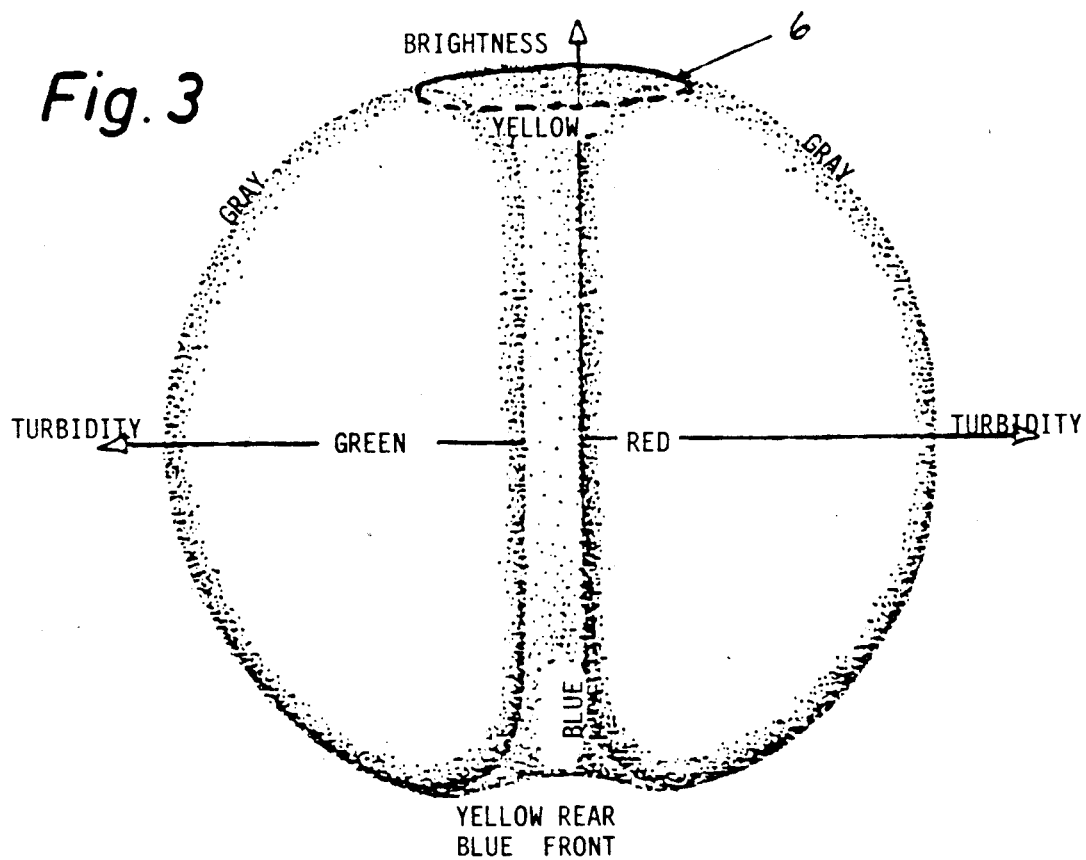
FIG. 3 is a schematic illustration of the development of colors in the ring structure.

The distribution of the colors in the axial direction is chosen such that each respective parallel plane extending parallel to the center plane 2 carries two colors with the same brightness as well as others of different brightness, whereby the brightness increases towards the top, towards the white line 6 and decreases towards the bottom, towards the black line (FIG. 3). Because yellow is brighter than blue, the pure yellow is located at a higher plane than pure blue (FIG. 3). In other words, the color shades vary in shade gradations of density values extending from a spatial location at the top for a maximum brightness value approaching the color white downwardly toward a spatial location at the bottom corresponding to black.

This color standard arrangement is equidistant in the sense of DIN 6164 (German standard 6164), i.e. the same visibly discernible color deviations are located in equidistant distances. In order to produce the same, the following procedure can be followed, proceeding from the center plane, for instance, as follows:

Initially the color tones located on the circular line 11' are determined as follows: From an arbitrary point of this circular line the distances to the closest two points of the pure base colors are sought.

The color tone in this arbitrary point is a mixture of the colors of said closest points and specifically the mixing ratio is determined in accordance with the inverse proportional relationship of the distances to these closest points. These distances are measured in accordance with the length of the circular portion on the circular line between the corresponding points.

When the entire circular line is occupied by color tones, further points are chosen in the sectors 14 to 19.

The beginning is made, for instance, in sector 15, the red sector, with points which are located radially outside of the pure red point 31.

The color mixture thereof is determined by the red of the red point and the gray on the circular line 11. Again, the composition of the color mixture corresponds to the inverse proportional distances on the radius extending to the pure red point 31.

Thereafter further radiuses are drawn to the points 31 and 32 to 35 and their color tone is determined analogous to the procedure of the red sector.

Accordingly, the color composition on the circular line 11', as well as that of the radiuses extending through the points 30–35 is determined.

The next step is the determination of the colors of the points on the common limits 40–45 of the color areas.

In order to produce the corresponding color tones, only the colors on the circular line 11' and the gray on the circular line 11 are used.

A circle is drawn through the point, of which the color tone must be determined, which circle extends concentric to the circular lines 11, 11' and the color points which are located on this circular line and the adjacent color points are sought.

The newly determined point in relation to its color tone is accordingly composed by the color tones of the four points which are closest adjacent thereof.

In this way it is possible to produce on a point grid the color tones sector by sector.

For points located outside of the center plane the same procedure is applied in an analogous way.

The above described sequence can be applied in a plurality of runs such that the grid consisting of locations or points, respectively, determined by their respective tone of color growth to be the longer or the finer. Depending on this fineness of the grid, the color areas can be made to come the longer the closer to the growing finer color equidistant.

It is to be noted clearly that depending on the determination of the tone of the colors, there are tolerances regarding the equidistance of these color tones. These tolerances can, however, be selectively decreased, in that the number of iterative runs for refining the point grid and its determination of the color tone is increased.

By means of the above explained method, it is possible to determine brown tones in an arbitrarily fine discrimination, namely, in accordance with the number of iterative runs. This is an important advantage of the present invention.

Figure 4:
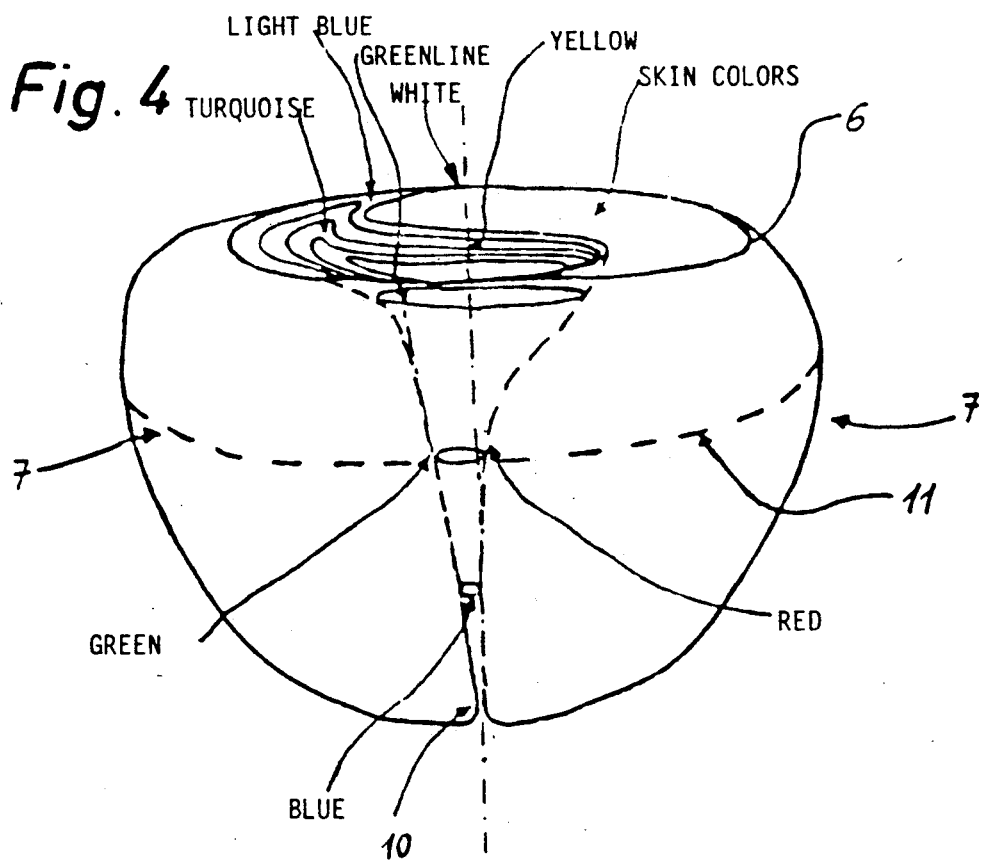
FIG. 4 is a perspective view of the ring structure shown in detail.

Hitherto one proceeded from the shape of an ideal torus for a simplification of the illustration of a color standard arrangement and the new color arrangement causes the spacial shape to deviate from this norm shape. This is based on the fact that the degree of turbidity can be discriminated more easily in case of darker color which causes in the upper part a radial increase of the torus and in the lower part an axial increase thereof. As illustrated in FIG. 4, the torus is accordingly deformed to the shape of an apple. Furthermore, a deformation from the circular shape of the central opening of the torus in its upper area results. As illustrated in FIG. 4, this central opening forms a funnel which, when viewed from above, is defined by an S-shaped side wall. The representative (most equidistant) color distribution of the cold colors is viewable from the top as a plan view of the opening of the funnel. The line of the respective clearest cold colors of a horizontal plane leaves the center along a small radius directed to the blue segment, increases its radius and rotates simultaneous to green, turquoise, light blue, and white location at the uppermost circle. The clearest warm colors can be seen in a view from the horizontal in the direction green. In the plane having the largest horizontal extent of the outer surface, red and green are located opposite of each other in the center thereof and the known six-partite arrangement according to FIG. 2 is produced. However, its center is shifted. Red is located closer (until preferably entirely in) to the center point. A theoretical viewing from above results in a schematic foursome partition in the directions yellow-blue, preferably at right angle to green-red.

The point, in which the funnel assumes in its section a bean-shaped deformation in upwards direction, is located in the plane green whereagainst towards the bottom it gets closer to a circular shape. Both rotations are led consequently to their termination up to the upper and lower edge, i.e. in downwards direction perpendicularly, in the upwards direction rotating horizontally. The view of the other upper torus half contains the skin colors. The color white is limited to the point where in top view the S-shaped boundary of the funnel contacts line 6. The line red-green approaches along its circular extent and its generation from the wall of the funnel a horizontal straight line. The vertical straight line (axes) comes closest to the wall of the funnel on a section from warm yellow to blue-violet (purple).

The colors arranged equidistantly in such a geometric arrangement form a color standard arrangement which can be used in color application in various ways. For instance, a model is foreseen, in which color carriers in form of axial sectional planes of the spacial shape are provided with the corresponding color specimens. These planes can be folded shaped and form therewith a color standard arrangement of the kind described, from which the data of the coordinates corresponding to any color component can be extracted. On each of these axial sections one color tone is dominant, which is varied in its different developments in accordance with brightness and turbidity, such as explained above. Accordingly, it is relatively simple to find a sought color.

The described color norm arrangement is specifically suitable in an application for improving the color-metric. In methods regarding color pictures made by cameras, measuring probes or holography, as well as for the recognizing of colors, it allows an objective judgement based on measurable tolerances. The numeric coverage of the colors gives the basis for the assignment of the color data and the corresponding data processing and storing. This allows in turn the numerically controlled reproduction of colors and indication of color data.

Specially, a specific tolerable color deviation can be set numerically for any specific individual case. If this tolerance is maintained in the entire color space, it is guaranteed that the deviations in colors remain within the area determined accordingly. Hereto the connecting vector between the location of the sought and the location of the color to be tested is determined and the length thereof is a measure for the color distance and the direction thereof indicates towards which other colors a deviation proceeds which allows accordingly definite corrections.

This allows a control of apparatuses relating to the optical or electromagnetic, respectively, picking up of colors by measuring feelers and cameras of apparatuses for the recognition of colors, color data allocation and handling, etc.

Furthermore, it is possible to produce color representations which support the illusion of space, direction and movement, especially reproductions of multidimensional (3D) photography, movies or videos.

It is the nature of the matter and of the movements described herein that all movements in a geometric sense are terminated consequently in the euclidean space. Practically and in the sense of the wave mechanics, quantum theory and mathematics of probability they end, however, with an infinitesimal tolerance which find a resonance someplace in the model or in the reality.

While there is shown and described a present preferred embodiment of the invention, it is to be distinctly understood that the invention is not limited thereto, but may otherwise variously embodied and practiced within the scope of the following claims.

I claim:

1. A color order spacial system for classifyably arranging distinct color shades to be derived from a number of at least three pure colors (31,33,35) related to complementary colors (30,32,34) and a color white (6), said spacial system comprising;
   display means having areas (14 to 19) in a spacial configuration for receiving each of said color shades in a predefined spacial location,
   said spacial configuration defining an inner surface zone (8) and an outer surface zone (7),
   said color shades of said spacial locations varying in respective radial and axial directions of said spacial configuration in visually substantially equal gradations:
   a. of density values extending from a spacial location for a maximum brightness value approaching the color white toward a spacial location for a maximum density value;
   b. of tint values derived from substantially uniformly varying mixing ratios of at least two of the pure colors and of decreasing chroma values defined by an increasing gray tint value,
   the associated spacial locations for at least three pure colors (30 to 35) being provided near the inner zone (8) and the chroma values decreasing toward the outer zone (7) whereby the most turbid colors are on the outside of said spacial configuration.

2. A spacial system according to claim 1, wherein said pure colours (30 to 35) are provided by primary colours (31, 33, 35) and secondary colours (30, 32, 34), each determined by a mixture of two of said primary colours, said secondary colours thereby providing complementary colours.

3. A spacial system according to claim 1, wherein said spacial locations for the pure colours are circumferentially distributed, each pure colour defining a corresponding colour sector (14 to 19) with a pure colour location (30 to 35) of an associated one of the pure colours, said colour sectors having common limits (40 to 45).

4. A spacial system according to claim 1, wherein additionally to said spacial locations for the pure colours spacial locations for non-pure tertiary colours are provided, each of said tertiary colours being determined by a mixture of three of said pure colours, said spacial locations for the tertiary colours being located further towards the peripheral zone (7) than the spacial locations (30 to 35) for the pure-colours.

5. A spacial system according to claim 1, wherein said chroma values decrease to a pure grey tint provided in said peripheral zone (7).

6. A spacial system according to claim 1, wherein a spacial location for a color black is provided apart from said spacial location for the maximum brightness value, said color black varying towards said spacial location for the color white in pure gray tints in an axial direction.

7. A spacial system according to claim 1, wherein said density values increase in axial directions from the spacial location for the maximum brightness value towards said spacial location for the maximum density value approaching the color black.

8. A spacial system according to claim 1, wherein said inner zone (8) providing said pure colors (30 to 35) in a distribution in a circumferential direction with reference to said axial direction bounds an opening of said spacial configuration said opening being free of any color.

9. A spacial system according to claim 8, wherein said opening (8) of said spacial configuration is funnel like defining a funnel opening towards the spacial location for the maximum brightness value.

10. A spacial system according to claim 9, wherein, when viewed towards the spacial location for the maximum brightness value an opening of said funnel is irregularly bounded by a boundary, thereby providing zones of varying approach of said center zone with respect to said axis.

11. A spacial system according to claim 10, wherein said boundary is S-shaped.

12. A spacial system according to claim 8, wherein said boundary intersects the aximuth (6) in an intersection point providing the spacial locations restricted for the colour white.

13. A spacial system according to claim 1, wherein said inner zone (8) is elongated along said axis in a length extension, said pure colours (30 to 35) defining colours decreasing from higher to lower brightness values, said pure colours (30 to 35) being distributed along said length extension of the center zone (8) according to their brightness values.

14. A spacial system according to claim 1, wherein said spacial configuration defines parallel planes (2,5,6,10) located parallel to a middle plane (2), each of said planes providing spacial locations for colour shades of equal brightness value.

15. A spacial system according to claim 1, wherein said spacial configuration defined a north pole (6) and an opposite south pole (10), said north pole providing a pole of brightness with a spacial location for the colour white and said south pole providing a pole of darkness with the spacial location for the colour black.

16. A spacial system according to claim 15, wherein said spacial configuration is radially increased towards the pole of brightness with respect to a regular shape.

17. A spacial system according to claim 15, wherein said spacial configuration is axially increased towards the pole of darkness with respect to a regular shape.

18. A spacial system according to claim 1, wherein said spacial configuration is defined substantially by an annular torous bounded by an inner jacket (8) and an outer jacket (7) and defining at least one aximuth (6,10), said inner jacket (8) defining the inner zone and said outer jacket (7) defining the outer zone.

19. A spacial system according to claim 1, wherein said pure colours comprise a colour yellow, a colour red and a colour blue defining primary colours.

20. A spacial system according to claim 1, wherein said pure colours comprise a colour green, a colour purple (violet) and a colour orange defining complementary respective secondary colours.

* * * * *